Nov. 15, 1955

J. H. GIBSON ET AL 2,723,512

MACHINES FOR REPAIRING THE VALVE SEAT
FACES OF PARALLEL SLIDE VALVES

Filed Nov. 15, 1952

Inventors
John H. Gibson
Richard H. Hunter
By
Pennie, Edmonds, Morton, Barrows, Taylor
Attorneys

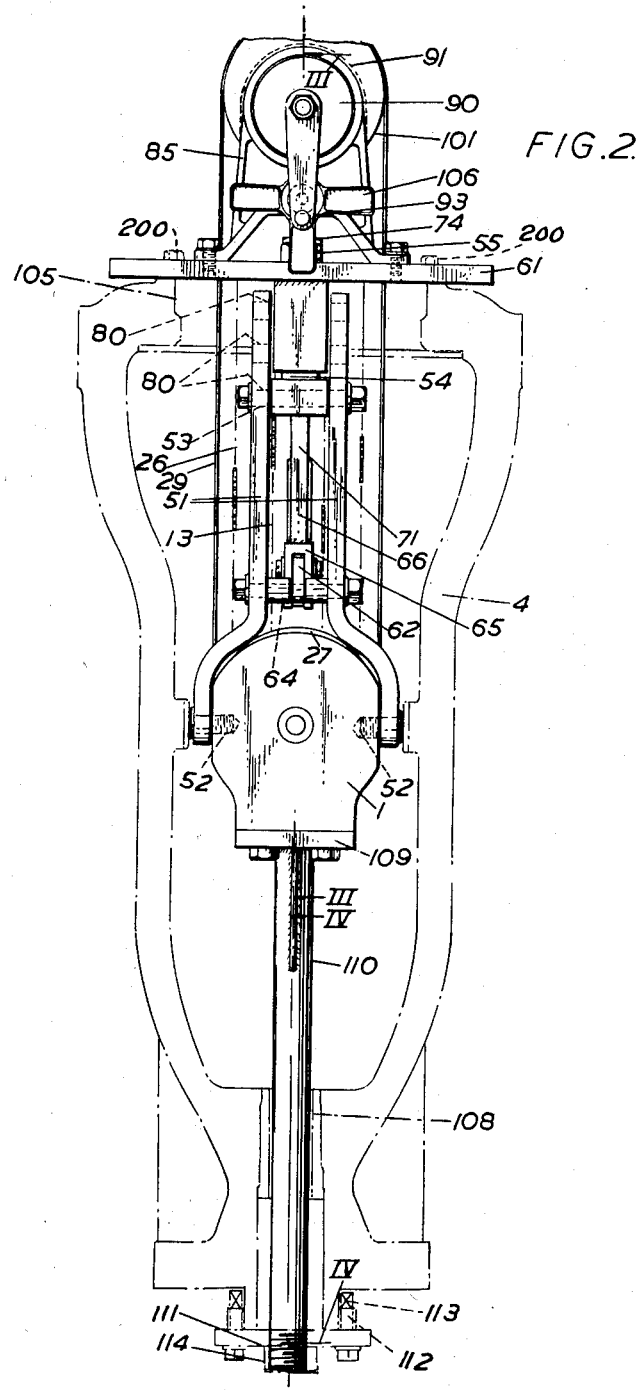

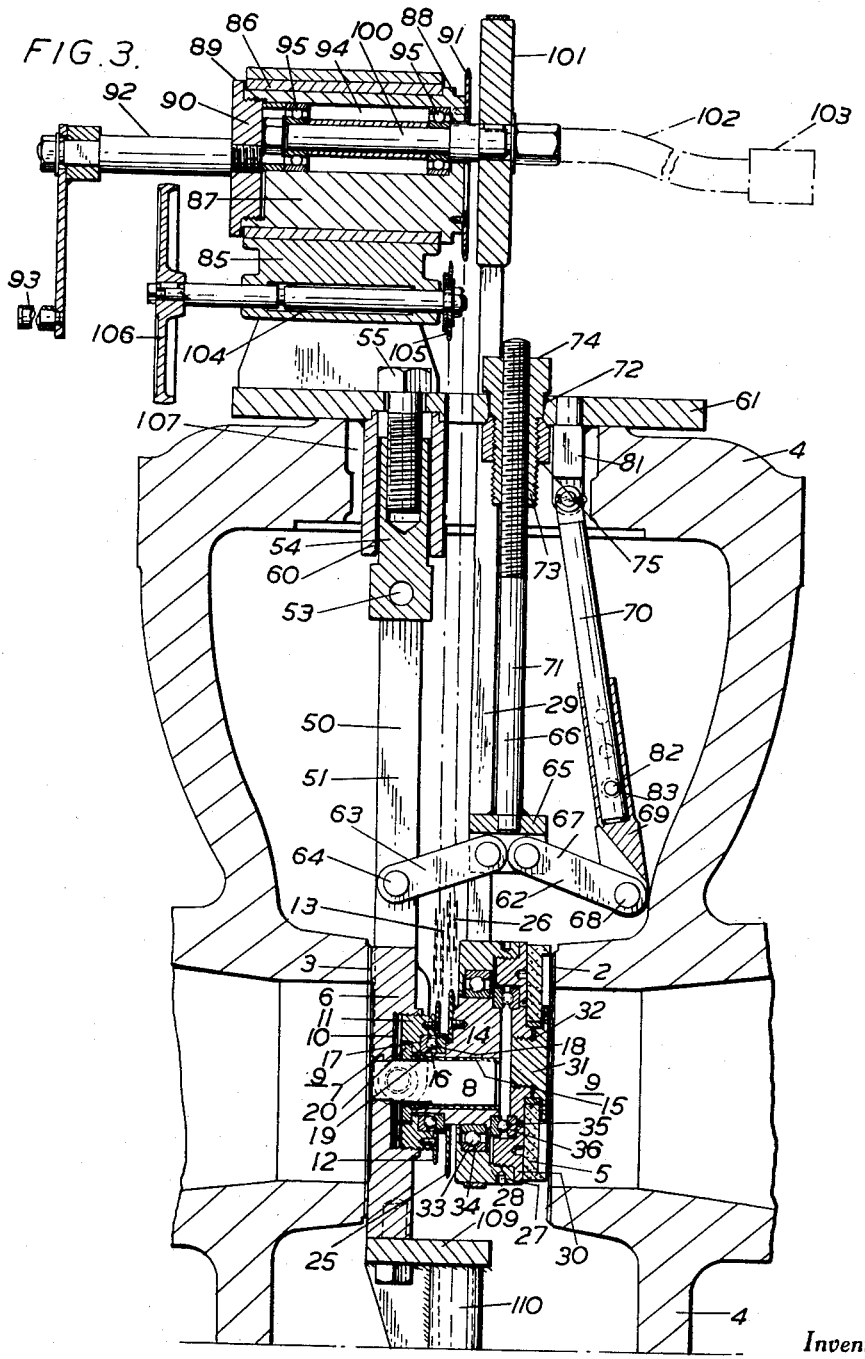

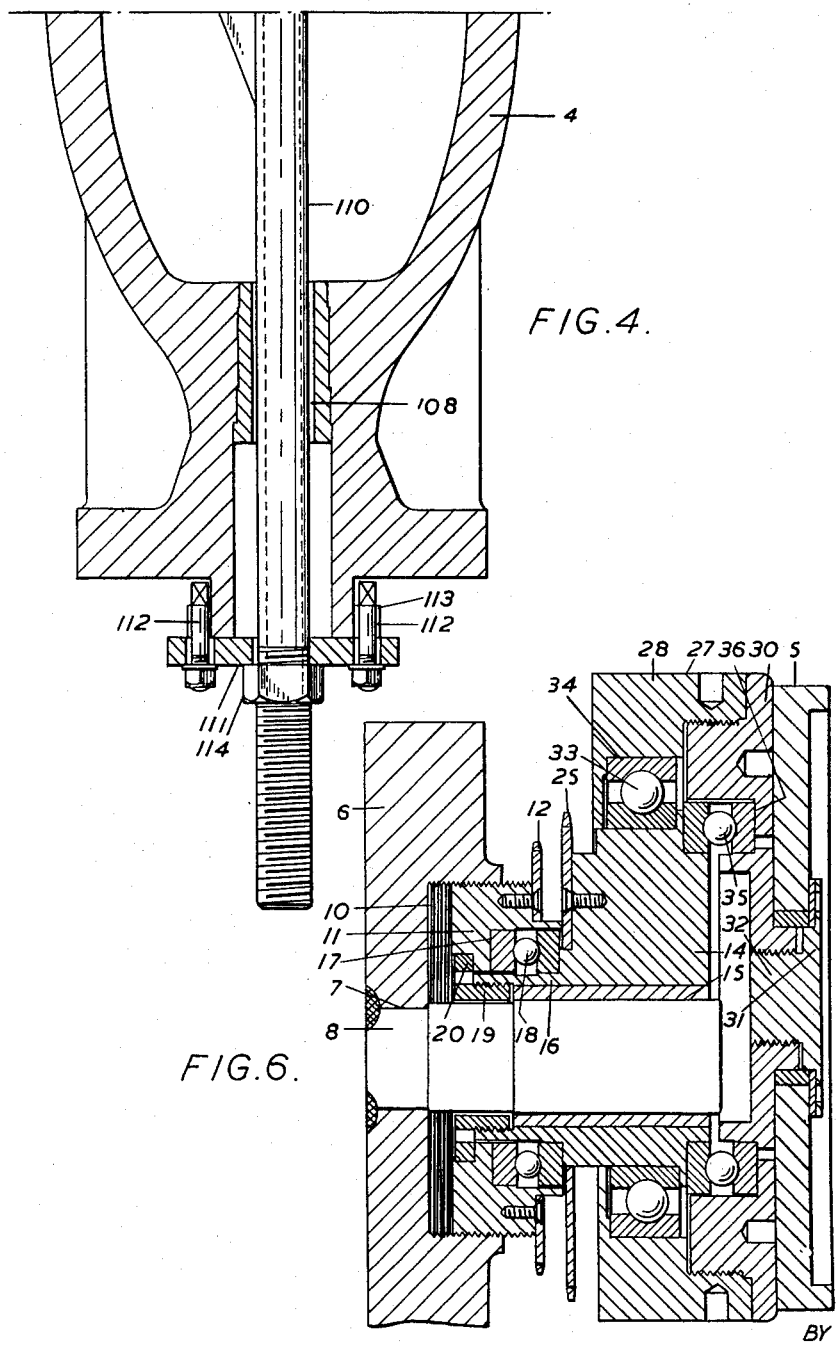

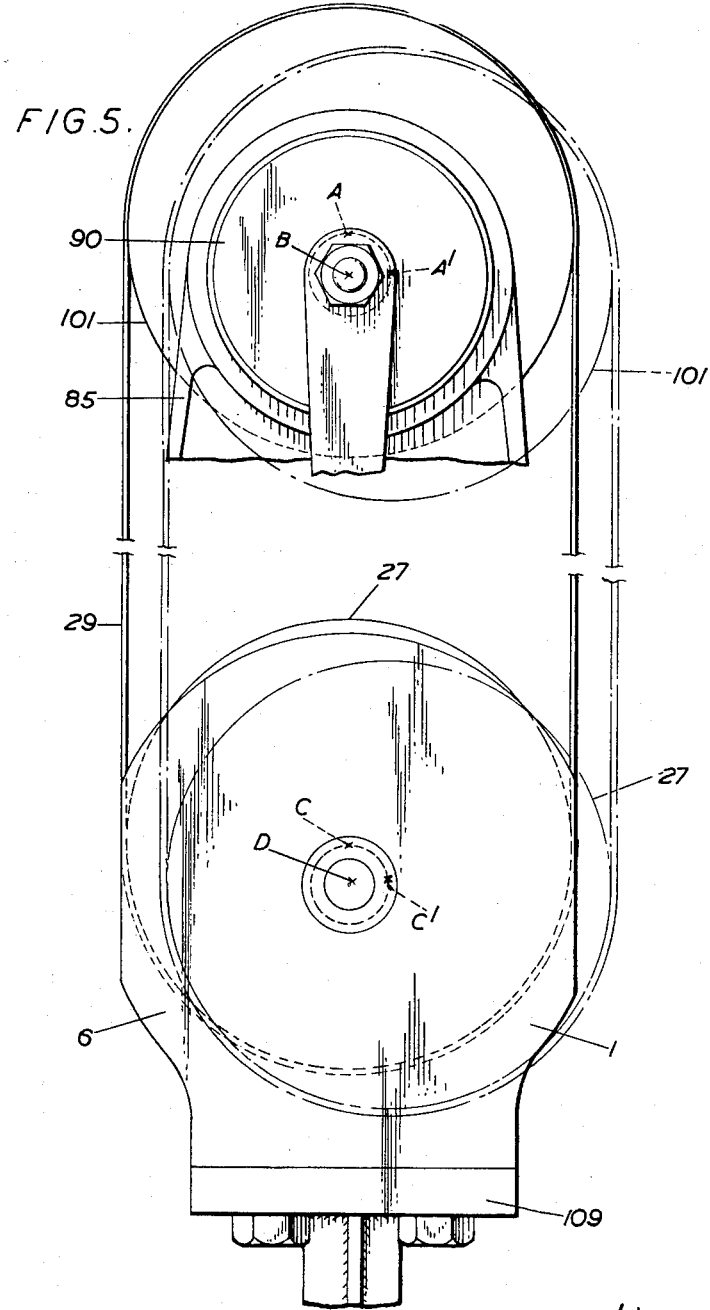

United States Patent Office 2,723,512
Patented Nov. 15, 1955

2,723,512

MACHINES FOR REPAIRING THE VALVE SEAT FACES OF PARALLEL SLIDE VALVES

John H. Gibson and Richard H. Hunter, London, England, assignors to Dewrance & Company Limited, London, England, a British company Application November 15, 1952, Serial No. 320,732

Claims priority, application Great Britain November 23, 1951

11 Claims. (Cl. 51—241)

This invention relates to machines for repairing the valve seat faces of parallel slide valves.

Patent specification No. 2,572,485 describes a machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to engage the valve body internally thereof, a second bearing which has an axis of rotation parallel with and eccentric to that of the first bearing and through which the rotatable member is rotatably mounted on the abutment member, locating means for locating the abutment member within the valve body relative to the valve seat face to be repaired, means for varying the relative positioning of the abutment member and gyratory means in the direction of the axis of rotation of the gyratory means, driving means for rotating the gyratory means, and driving means for rotating the rotatable member. It is described therein how such a machine can be used for operating upon a valve seat face after inserting the assembly of abutment member, rotatable member, and gyratory means within the valve body. As illustrated the driving means for rotating the gyratory means comprise a belt operated by a pulley outside the valve body fixedly mounted on a base plate secured to the valve body at an opening therein. The belt is tensioned by jockey pulleys in contact with the belt and on respective biassed arms.

In the application of the machine to the grinding of a valve seat face, it may be desired to rotate the gyratory means at a speed of two to three thousand revolutions per minute.

It is found that the planetory movement given to the gyratory means may bring about undesirable variations in belt tensioning.

It is very desirable to avoid checks in the drive of the gyratory means while its axis of rotation is moved around, while remaining parallel to, an axis fixed in a firmly supported abutment member.

An object of the present invention is to provide improved means for transmitting the drive to the gyratory means.

Another object is to provide for the improved mounting of the gyratory means.

Another object is to provide for the improved supporting and locating of the abutment member.

Features of novelty characterising our invention are pointed out in the claims annexed to and forming part of the present specification. The above and further objects and advantages of the invention will be apparent from the accompanying drawings and from the subsequent description relative thereto in which we have illustrated and described a preferred embodiment of our invention.

The invention will now be described, by way of example, with reference to the accompanying drawings in which:

Figure 2 is an outside elevation of the machine as viewed from the left hand side of Figure 1, the relative position of the valve body being again shown in dotted lines indicating a section of the valve body;

Figures 3 and 4 are views of the machine to a larger scale, in section on the lines III—III and IV—IV respectively of Figure 2, the valve body being shown in section in these figures in full lines;

Figure 5 is an elevation from the same aspect as Figure 2, but showing only selected parts of the machine, and to a larger scale, in order to illustrate the correspondence between two eccentric motions;

Figure 6 is an enlarged representation of part of Figure 3.

Figure 1:
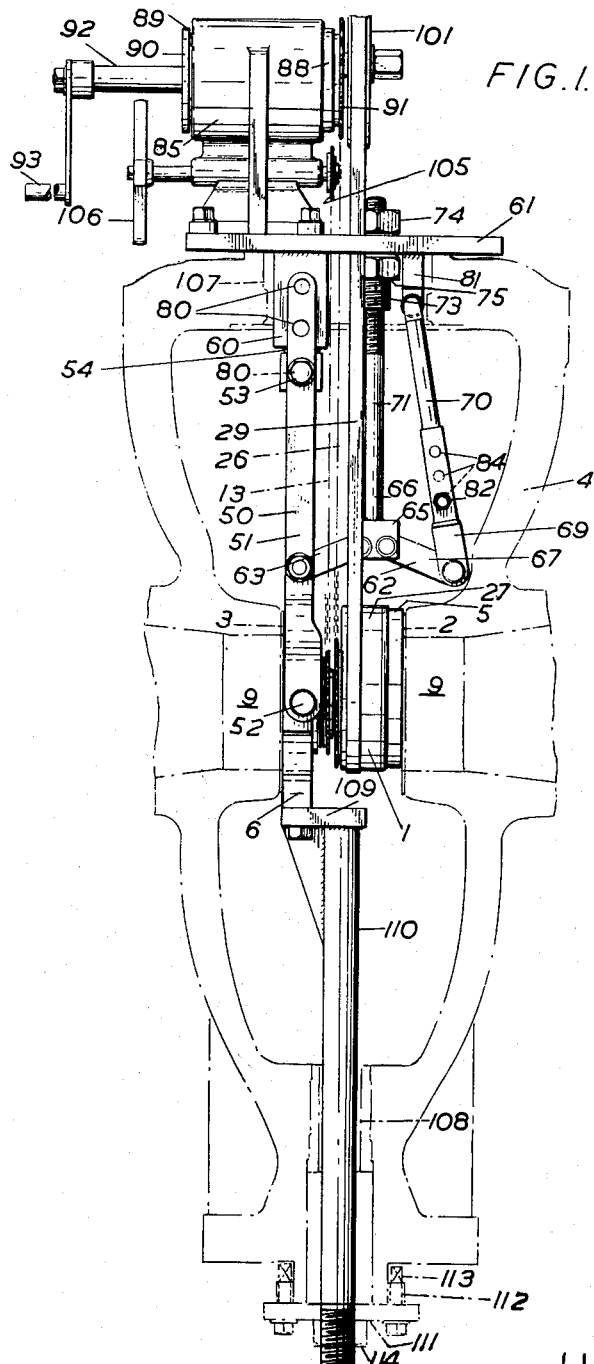
Figure 1 is an outside side elevation of the machine, the relative position of the valve body when the machine is applied in the intended way with respect thereto being shown in dotted lines indicating a section of the valve body.

Referring to the drawings, the machine includes a grinding head 1 adapted to fit between the valve seat faces 2 and 3 of the parallel slide valve 4 to be repaired. The grinding head comprises a grindstone 5 at one end thereof for operating on the valve seat face 2 to be repaired, and at the other end includes an abutment member 6 of generally circular form adapted to engage the valve seat face 3 opposite that to be repaired.

Referring to Figure 3, and particularly to Figure 6, the abutment member 6 is formed with a central bore 7 within which fits an axle 8 welded to the abutment member and projecting therefrom towards the plane of the valve seat face 2 to be repaired, with its axis parallel, when the abutment member 6 engages the valve seat face 3, to the axis of the valve passage 9. A recess 10 in the abutment member is formed with an internal thread in engagement with a complementary external thread on a rotatable annular feed part 11 adapted for rotation about the axis of the axle 8. The rotatable annular feed part 11 has secured thereto a sprocket wheel 12, coaxial with its axis of rotation, by which it may be rotated through the medium of the chain 13. On the axle 8 is rotatably mounted a rotatable member 14 (shown in Figure 6), which carries a bushing 15 for making contact with the axle, and which is formed with a prolongation 16 extending in a direction away from the grindstone 5 within the rotatable annular feed part 11. The rotatable annular feed part 11 is formed with a recess 17 within which, between the inner wall of the recess 17 and the prolongation 16 of the rotatable member 14 is housed a ball thrust bearing 18. The rotatable member 14 and the rotatable annular feed part 11 are maintained in proper mutual relationship by a sleeve 19 screwed into the prolongation 16 of the rotatable member 14 and having a peripheral flange 20 lying within a second recess in the rotatable annular feed part 11. Two diametrically opposed apertures in the flange 20 provide means for getting a purchase on the sleeve 19 when it is desired to insert or remove it.

To the rotatable member 14 is secured a sprocket wheel 25 coaxial with the axle 8 and engaged by a chain 26 by which the rotatable member 14 can be rotated around the axle. Upon the rotatable member 14 is mounted a tool holder 27 arranged for rotation about an axis parallel with and eccentric to the axis of the axle 8. The tool holder 27 comprises a first part 28 formed with a cylindrical surface with which a flat belt 29 makes a driving connection and, screwed into the first part on the side thereof remote from the abutment member 6, a second part 30 carrying the grindstone 5, the grindstone being maintained in position by a retaining plate 31 having a threaded part 32 screwed into the second part 30 of the tool holder. The tool holder 27 is mounted on the rotatable member by a ball bearing 33 housed in a recess 34 in the first part 28 of the tool holder and in a recess in the rotatable member 14 so arranged that movement of the said first part 28 of the tool holder with respect to the rotatable member 14 in the direction away from the abutment member 6 is prohibited while movement in the reverse direction (assuming that the second part 30 of the tool holder has first been unscrewed from said first part 28) releases the bearing 33, and by a ball thrust bearing 35 housed in a recess 36 in the second part 30 of the tool holder and in a recess in the rotatable member. Separation of the two parts 28 and 30 of the tool holder gives access to the bearings 33 and 35.

Referring to Figures 1, 2 and 3, the grinding head 1 is positioned with respect to the valve seat face 3 opposite that to be repaired by a movable support 50 including a forked end portion 51 connected by pivot pins 52 to the abutment member 6 on opposite sides thereof; the arms of fork 51 are pivotally mounted upon a pin 53 traversing the head of an adjusting rod 54, the shank of which is bored and tapped and engaged by a complementary bolt 55 passing through an appropriate bore in a base plate 61. The shank of the adjusting rod 54 is arranged for sliding within a sleeve 60 welded to the base plate 61.

Biassing means 62 are provided for exerting a force on the movable support 50 to urge the abutment member 6 against the valve seat face 3 opposite that to be repaired. The biassing action is effected in the neighborhood of the abutment member 6 by a toggle comprising a link 63 hinged at one end to a pin 64 extending through the arms of the forked end portion 51 of the movable support 50 and at the other end to the head 65 of toggle operating means 66, and comprising also a link 67 connected at one end to said head 65 and at the other end pivoted to a pin 68 in a forked end 69 of an arm 70 pivotally connected to a support 81 projecting from and welded to the base plate 61. The forked end 69 of the arm is adapted for making contact with the internal surface of the valve body.

The toggle operating means 66 includes a threaded push rod 71 to one end of which the head 65 is welded and having its other end threaded and extending through an aperture 72 in the base plate 61; the push rod 71 is located with respect to the base plate 61 by a sleeve 73 whose end 74 remote from the head 65 is formed as a nut permitting it to be turned by means of a spanner; the sleeve 73 extends through the aperture 72 and is externally threaded at the end opposite to the end 74 for engagement with a swivel nut 75. The sleeve 72, the swivel nut 75 mounted thereon and the aperture 72 in the base plate are so formed that a certain tolerance is allowed in the angle at which the push rod 71 extends through the base plate 61.

The effective length of the movable support 50 is adjustable by means other than the bolt 55; thus the pin 53 through the head of the adjusting means 54 can be placed in any of three pairs of bores 80 (shown in Figures 1 and 2) in the members of the forked end portion 51 of the movable support 50. The length of the arm 70 is also adjustable; the forked end 69 is arranged for movement telescopically with respect to the remainder of the arm 70 and is secured thereto by a pin 82 which passes through a bore 83 in the arm and can pass through any of three pairs of opposite apertures 84 in the telescopic part.

On the side of the base plate 61 remote from the grinding head is mounted a bracket 85 carrying a bushing 86 within which is mounted for rotation about an axis parallel to the axle 8 of the grinding head 1 a bearing member 87 of substantial length. The bearing member 87 is located axially by a peripheral flange 88 adjacent an end of the bearing member 87 and a similar flange 89 on a removable plate 90 secured to the other end of the bearing member 87, the flanges being adapted to engage the ends of the bushing 86. To the end of the bearing member 87 remote from the removable plate 90 there is secured a sprocket wheel 91 having the same number of teeth as the sprocket wheel 25 secured to the rotatable member 14 of the grinding head 1, and the chain 26 engages both sprocket wheels. Extending from the removable plate 90 concentrically with the bushing 86 is a spindle 92 of an operating handle 93 for turning the bearing member 87.

The bearing member 87 is formed with a bore 94 of which the axis is parallel with and eccentric to that of the bearing member 87. The bore houses widely spaced ball bearings 95 for supporting the spindle 100 of a driving pulley 101 with which is associated a flexible drive 102 (schematically shown in dotted lines) for effecting connection with an electric driving motor 103 (schematically shown in dotted lines). The driving pulley 101 is arranged for driving the belt 29 engaging the cylindrical part of the tool holder 27.

Removal of the plate 90 gives access to the parts arranged inside the bore 94 in the bearing member.

The eccentricity of the spindle 100 of the driving pulley 101 with respect to the bearing member 87 is the same as the eccentricity of the tool holder 27 with respect to the rotatable member 14. Moreover the chain 26 is initially arranged on the sprocket wheels 91 and 25 with the axis of the driving spindle 100 in the same relative position to the axis of the bearing member 87 as the axis of the tool holder 27 relative to the axis of the rotatable member 14. Thus the apparatus may be set up with the axis of the spindle 100 in the position A shown in Figure 5 with respect to the axis B of the bearing member 87, and the axis of the tool holder 27 in the position C with respect to the axis D of the rotatable member 14. Seeing that the sprocket wheels 91 and 25 have the same numbers of teeth, should the bearing member 87 be turned by the handle 93 so that the axis of the drive shaft 100 attains a new position, for example A', then the axis of the tool holder 27 will attain a corresponding position C' such that the driving belt 29 around the driving pulley 101 and the tool holder 27 maintains the same tension. The driving pulley 101 and the tool holder 27 are shown in the first case in full, in the second case in dotted lines.

The bracket 85 is also formed with a bore through which extends a spindle 104 on which is mounted a sprocket wheel 105 which is engaged by the chain 13 which engages the sprocket wheel 12 secured to the rotatable annular feed part 11 of the grinding head 1; the spindle 104 may be turned by hand through a four-armed star wheel 106 at the other end thereof from the sprocket wheel.

The base plate 61 is adapted to be secured by bolts 200 onto the valve body 4 in a position spanning an opening 107 opposite the aperture 108 in the valve body through which (when the valve is assembled for operation) the valve spindle passes. The base plate is formed with suitable openings for the passage of the chains 13 and 26 and the driving belt 29.

To the side of the abutment member 6 remote from the base plate 61 there is secured with the intermediary of a bracket 109 a spindle 110 extending therefrom in a direction away from the base plate and which is adapted to extend through and beyond the aperture 108. The spindle 110 is of smaller diameter than the aperture 108 in the valve body. A plate 111 having a central aperture can be threaded over the spindle and secured by T-bolts 112 to a flange 113 on the valve body, which flange has over-size slots which are spanned by the heads of the T-bolts 112 and a nut 114 can be threaded on the spindle 110 and tightened to engage the plate 111.

For operating the machine to grind a valve seat face of a parallel slide valve for which it may be adapted, the machine is arranged with chains 13 and 26 and the belt 29 of requisite length to suit the size of valve, the pin 53 is inserted through the appropriate bores 80, and the pin 82 is inserted through the appropriate bores 84. The star wheel 106 is rotated if necessary to reduce the distance between the grindstone 5 and the abutment member 6. The cover is removed from the opening 107 in the part of the valve body 4 opposite the aperture 108 for the passage of the valve spindle and the movable parts of the valve including the valve spindle are removed. The machine is then applied to the valve body so that the spindle 110 enters the aperture 108 and the grinding head 1 enters the space between the valve seat faces 2 and 3, with the grindstone 5 adjacent the valve seat face 2 to be repaired. The base plate 61 is secured to the valve body 4 at the opening 107. The bolt 55 is turned if necessary to manoeuvre the abutment member 6 to the appropriate position opposite the valve seat face 3 when the axle 8 is coaxial with the valve passage 9. The head 74 of the sleeve 73 on the push rod 71 is then rotated in the direction to effect the bringing of the forked end 69 of the arm 70 into contact with an internal surface of the valve body, and then continued so that the toggle, using the valve body as an abutment, exerts a force on the movable support 50 to press the abutment member 6 firmly against the valve seat face 3 opposite that which is to be repaired. The plate 111, T-bolts 112 and nut 114 are then applied so that the spindle 110 is located with respect to the aperture 108. When the electric motor 103 is started, the grindstone 5 is rotated at a high speed. Rotation of the star wheel 106 in the appropriate direction effects rotation of the rotatable annular feed part 11 with respect to the abutment member 6 so that it advances with respect thereto in the direction of the valve seat face 2 to be repaired, carrying with it the rotatable member 14, the tool holder 27 and the grindstone 5, so that the grindstone 5 may be brought into contact with the valve seat face 2 to be repaired. Rotation of the rotatable member 14 by manual operation of the handle 93 produces a planetary movement of the grindstone 5 in relation to the valve seat face 2, with the result that the grindstone 5 effectively operates upon the whole of the face 2. The star wheel 106 is operated until the valve seat face 2 has been ground to the requisite extent.

During the grinding operation, the abutment member 6 is pressed against the valve seat face 3 with a force independent of and desirably many hundreds of times larger than the actual force between the grindstone 5 and the valve seat face 2. The proper seating of the abutment member 6 upon the valve seat face 3 is facilitated by the fact that it is able to rock relatively to the support 50. Thus the grinding head is firmly located. The spindle 110 and the movable support 50 assist in maintaining the grinding head against lateral movements. The bolt 55 prevents movement of the grinding head in the direction away from the base plate, while the nut 114 prevents movement in the direction towards the base plate. The provision of the axle 8 of the grinding head 1, secured to the abutment member 6, makes for firm supporting of the rotatable member 14, more especially since it has a relatively long contact therewith through the bush 15, and the two bearings 33 and 35 make for maintenance of the relative position of the tool holder 27 on the rotatable member 14. Thus vibration of the grindstone 5 is substantially avoided in spite of the high rate of revolution at which it is operated. Since the axis of the driving shaft 100 has always a position relative to the axis of the bearing member 87 in which it is eccentrically mounted which is the same as the position of the axis of the tool holder 27 relative to the axis of rotation of the rotatable member 14 in the grinding head 1, the driving belt 29 has no tendency as the handle 93 is turned to become too slack or too tight, and thus slowing or stoppage by slipping or inordinate tensioning forces cannot interfere with the grinding operation.

The machine can be used for lapping a valve seat face by removing the grindstone 5 from the tool holder 27 and replacing it by an appropriate lapping plate, and by disconnecting the flexible drive 102 from the driving pulley 101 and mounting in its place on the driving shaft a further handle so that the driving pulley may be turned manually at any desired low speed appropriate for a lapping operation.

Should the valve be in the position upside down with respect to the position shown, i. e. with the aperture 108 at the top, when the machine is to be applied thereto, the nut 114 instead of the bolt 55 can be used for the operation of manoeuvring the grinding head into the desired position relative to the axis of the valve passage 9.

We claim:

1. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to engage the valve body internally thereof, a second bearing which has an axis of rotation parallel with and eccentric to that of the first bearing and through which the rotatable member is rotatably mounted on the abutment member, a rotary driving member whose axis of rotation is spaced from the axis of rotation of the gyratory means, endless flexible driving means coupling the gyratory means with the rotary driving member for drive of the gyratory means by the rotary driving member, a rotatable bearing member, a third bearing through which the rotary driving member is mounted on the rotatable bearing member, supporting means for the rotatable bearing member, a fourth bearing through which the rotatable member is rotatably mounted in the supporting means and which has an axis of rotation parallel with the third bearing and with the same degree of eccentricity as regards the third bearing as that of the second bearing as regards the first bearing, means coupling the rotatable member with the rotatable bearing member for drive of the rotatable member in synchronism with the rotatable bearing member, driving means arranged for rotating the rotary driving member and driving means arranged for rotating the rotatable bearing member.

2. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to engage the valve body internally thereof, a second bearing which has an axis of rotation parallel with and eccentric to that of the first bearing and through which the rotatable member is rotatably mounted on the abutment member, of the rotatable and abutment members one member including co-operating internally and externally threaded feed parts adapted upon the rotation of one feed part relative to the other to effect movement of the gyratory means longitudinally of its axis of rotation, a movable support hingedly connected to the abutment member at opposite portions of the abutment member, biasing means adapted in operation by bearing on the movable support to urge the abutment member against the valve seat face opposite that to be repaired, driving means arranged for rotating the gyratory means, driving means arranged for rotating the rotatable member, and means arranged for producing relative rotation of the feed parts.

3. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to engage the valve body internally thereof, a second bearing which has an axis of rotation parallel with and eccentric to that of the first bearing and through which the rotatable member is rotatably mounted on the abutment member, of the rotatable and abutment members one member including co-operating internally and externally threaded feed parts adapted upon the rotation of one feed part relative to the other to effect movement of the gyratory means longitudinally of its axis of rotation, a movable support hingedly connected to the abutment member at opposite portions of the abutment member, a base plate adapted to be secured on the valve body at an opening therein, means pivotally mounting the movable support on the base plate, biasing means adapted in operation by bearing on the movable support to urge the abutment member against the valve seat face opposite that to be repaired, driving means arranged for rotating the gyratory means, driving means arranged for rotating the rotatable member, and means arranged for producing relative rotation of the feed parts.

4. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to engage the valve body internally thereof, a second bearing which has an axis of rotation parallel with and eccentric to that of the first bearing and through which the rotatable member is rotatably mounted on the abutment member, of the rotatable and abutment members one member including co-operating internally and externally threaded feed parts adapted upon the rotation of one feed part relative to the other to effect movement of the gyratory means longitudinally of its axis of rotation, a movable support hingedly connected to the abutment member at opposite portions of the abutment member, biasing means adapted in operation by bearing on the movable support to urge the abutment member against the valve seat face opposite that to be repaired, the biasing means being adapted to exert against the inner part of the valve body a reaction to the force with which the abutment member is urged against the valve seat face opposite that to be repaired, driving means arranged for rotating the gyratory means, driving means arranged for rotating the rotatable member, and means arranged for producing relative rotation of the feed parts.

5. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to engage the valve body internally thereof, a second bearing which has an axis of rotation parallel with and eccentric to that of the first bearing and through which the rotatable member is rotatably mounted on the abutment member, of the rotatable and abutment members one member including co-operating internally and externally threaded feed parts adapted upon the rotation of one feed part relative to the other to effect movement of the gyratory means longitudinally of its axis of rotation, a movable support hingedly connected to the abutment member at opposite portions thereof, a base plate adapted to be secured on the valve body at an opening therein, means pivotally mounting the movable support on the base plate, an arm pivotally mounted on the base plate, a toggle hinged at one end to the support and at the other end to the arm, the toggle and arm being adapted to exert against an inner part of the valve body a reaction to the force with which the abutment member is urged against the valve seat face to be repaired, toggle-operating means connected with the toggle, driving means arranged for rotating the gyratory means, driving means arranged for rotating the rotatable member, and means arranged for producing relative rotation of the feed parts.

6. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to engage the valve body internally thereof, a second bearing which has an axis of rotation parallel with and eccentric to that of the first bearing and through which the rotatable member is rotatably mounted on the abutment member, of the rotatable and abutment members one member including co-operating internally and externally threaded feed parts adapted upon the rotation of one feed part relative to the other to effect movement of the gyratory means longitudinally of its axis of rotation, a movable support hingedly connected to the abutment member at opposite portions of the abutment member, a base plate adapted to be secured on the valve body at an opening therein, means pivotally mounting the movable support on the base plate, an arm, pivotally mounted on the base plate, a toggle hinged at one end to the support and at the other end to the arm, the toggle and arm being adapted to exert against an inner part of the valve body a reaction to the force with which the abutment member is urged against a valve seat face to be repaired, a threaded push rod adapted for operating on the toggle at the toggle joint, a threaded sleeve mounted upon the base plate and engaging with the threaded push rod, driving means arranged for rotating the gyratory means, driving means arranged for rotating the rotatable member, and means arranged for producing relative rotation of the feed parts.

7. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to engage the valve body internally thereof, a second bearing which has an axis of rotation parallel with and eccentric to that of the first bearing and through which the rotatable member is rotatably mounted on the abutment member, of the rotatable and abutment members one member including co-operating internally and externally threaded feed parts adapted upon the rotation of one feed part relative to the other to effect movement of the gyratory means longitudinally of its axis of rotation, a base plate adapted to be secured on the valve body at an opening therein, a movable support hingedly connected to the abutment member at opposite portions of the abutment member, means pivotally mounting the movable support on the base plate, a spindle secured to the abutment member and adapted to extend with clearance through and beyond an aperture in the valve body provided for the passage of the valve spindle and disposed opposite the opening, adjustable locating means adapted to locate the spindle with respect to the valve body at such aperture, driving means arranged for rotating the gyratory means, driving means arranged for rotating the rotatable member, and means arranged for producing relative rotation of the feed parts.

8. A machine for repairing a valve seat face of a parallel slide valve, comprising gyratory means for applying a tooling action to the valve seat face, a rotatable member, a first bearing through which the gyratory means is rotatably mounted on the rotatable member, an abutment member adapted to engage the valve body internally thereof, a second bearing which has an axis of rotation parallel with and eccentric to that of the first bearing and through which the rotatable member is rotatably mounted on the abutment member, of the rotatable and abutment members one member including co-operating internally and externally threaded feed parts adapted upon the rotation of one feed part relative to the other to effect movement of the gyratory means longitudinally of its axis of rotation, a base plate adapted to be secured on the valve body at an opening therein, a movable support hingedly connected to the abutment member, a spindle secured to the abutment member and adapted to extend with clearance through and beyond an aperture in the valve body provided for the passage of the valve spindle and disposed opposite the opening, a locating plate adapted to contact at adjustable positions the valve body at the outer side of the valve spindle aperture, a nut adapted by engaging the spindle and the plate to locate the spindle with respect to the aperture, driving means arranged for rotating the gyratory means, driving means arranged for rotating the rotatable member, and means arranged for producing relative rotation of the feed parts.

9. A machine for repairing a valve seat face of a parallel slide valve, comprising gyratory means for applying a tooling action to the valve seat face, means supporting the gyratory means and maintaining it with its axis of rotation both parallel to and in a path around a first fixed axis, a rotary driving member for the gyratory means spaced from the gyratory means, means supporting the rotary driving member and maintaining it with its axis of rotation both parallel to the first fixed axis and in a path around a second fixed axis, the two paths being identically similar, means operatively coupling the means supporting the gyratory means and the means supporting the rotary driving member for synchronous movement of their axes of rotation along the respective paths around the respective fixed axes, endless flexible driving means coupling the gyratory means with the rotary driving member for rotary drive by the rotary driving member, driving means arranged for rotating the rotary driving member, and means arranged for effecting movement of the axis of the rotary driving member around the second path.

10. A machine for repairing a valve seat face of a parallel slide valve, comprising gyratory means for applying a tooling action to the valve seat face, a first mounting member, a first bearing through which the gyratory means is rotatably mounted on the first mounting member, an abutment member, a first connection through which the first mounting member is mounted on the abutment member to permit movement of the axis of the first bearing, a rotary driving member for the gyratory means spaced from the gyratory means, a second mounting member, a second bearing through which the rotary driving member is rotatably mounted on the second mounting member, supporting means for the second mounting member, a second connection through which the second mounting member is mounted on the supporting means to permit the same movement of the axis of the second bearing as the movement of the axis of the first bearing, means coupling the first and second mounting members for movement of the axis of the second bearing with the movement of the axis of the first bearing to maintain a constant distance between said axes, endless flexible driving means coupling the gyratory means for rotary drive by the rotary driving member, driving means arranged for rotating the rotary driving member, and means arranged for moving the second mounting member relative to the supporting means.

11. A machine for repairing a valve seat face of a parallel slide valve, comprising gyratory means for applying a tooling action to the valve seat face and having a cylindrical surface coaxial with its axis of rotation, means supporting the gyratory means and maintaining it with its axis of rotation both parallel to and in a path around a first fixed axis and including co-operating internally and externally threaded parts adapted upon the rotation of one part relative to the other to effect movement of the gyratory means in the direction of its axis of rotation, a rotary driving member for the gyratory means spaced from the gyratory means, means supporting the rotary driving member and maintaining it with its axis of rotation both parallel to the first fixed axis and in a path around the second fixed axis, the two paths being identically similar, means coupling the means supporting the gyratory means and the means supporting the rotary driving member for synchronous movement of their axes of rotation along the respective paths around the respective fixed axes, a driving belt coupling the gyratory means by engaging its cylindrical surface with the rotary driving member for rotary drive by the rotary driving member, driving means arranged for rotating the rotary driving member, and means arranged for effecting movement of the axis of the rotary driving member around the second path.

References Cited in the file of this patent

UNITED STATES PATENTS

| | | |
|---|---|---|
| 801,350 | Williams | Oct. 10, 1905 |
| 1,478,971 | Lumsden | Dec. 25, 1923 |
| 1,508,378 | Brown | Sept. 16, 1924 |
| 2,272,974 | Indge | Feb. 10, 1942 |
| 2,372,341 | Shanley | Mar. 27, 1945 |
| 2,572,485 | Hunter | Oct. 23, 1951 |

FOREIGN PATENTS

| | | |
|---|---|---|
| 483,601 | Germany | Oct. 3, 1929 |